(12) United States Patent
Campbell et al.

(10) Patent No.: US 7,401,230 B2
(45) Date of Patent: Jul. 15, 2008

(54) SECURE VIRTUAL MACHINE MONITOR TO TEAR DOWN A SECURE EXECUTION ENVIRONMENT

(75) Inventors: Randolph L. Campbell, Folsom, CA (US); Gehad M. Galal, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 10/814,218

(22) Filed: Mar. 31, 2004

(65) Prior Publication Data

US 2005/0223220 A1 Oct. 6, 2005

(51) Int. Cl.
  G06F 15/167 (2006.01)
  G06F 9/44 (2006.01)
  G06F 12/00 (2006.01)

(52) U.S. Cl. .................. 713/190; 709/215; 703/21; 711/152

(58) Field of Classification Search .......... 713/189, 713/190; 709/215; 703/21; 711/152
  See application file for complete search history.

(56) References Cited

U.S. PATENT DOCUMENTS

| | | | |
|---|---|---|---|
| 4,787,031 A * | 11/1988 | Karger et al. | 718/100 |
| 5,459,869 A * | 10/1995 | Spilo | 719/324 |
| 6,397,242 B1 | 5/2002 | Devine et al. | |
| 6,496,847 B1 * | 12/2002 | Bugnion et al. | 718/1 |
| 6,704,925 B1 | 3/2004 | Bugnion | |
| 7,111,146 B1 * | 9/2006 | Anvin | 711/207 |

OTHER PUBLICATIONS

Cox, Richard, "A Virtual Memory Management Unit for Denali", Intel Research Seattle,(Oct. 16, 2002).
Intel, "Twenty-to-One Consolidation on Intel Architecture", (Feb. 2002).
Munro, Jay, "Virtual Machines & VMware, Part I", Copyright (c) Ziff Media Inc.,(2001).

* cited by examiner

Primary Examiner—Nasser Moazzami
Assistant Examiner—Mohammad Reza
(74) Attorney, Agent, or Firm—Blakley, Sokoloff, Taylor & Zafman LLP

(57) ABSTRACT

Disclosed is a processor having a normal execution mode and a secure execution mode to create a secure execution environment. A secure virtual machine monitor (SVMM) implements the secure execution environment in which a plurality of separate virtual machines are created that operate simultaneously and separately from one another including at least a first virtual machine to implement trusted guest software in a protected memory area and a second virtual machine to implement a non-trusted guest operating system (OS) simultaneously in a non-protected memory area. Responsive to a command to tear down the secure execution environment, the SVMM causes the processor to exit out of the secure execution mode, tears down the secure execution environment, and instructs the non-trusted guest OS to resume control in the normal execution mode.

22 Claims, 6 Drawing Sheets

SECURE VIRTUAL MACHINE MONITOR TO TEAR DOWN A SECURE EXECUTION ENVIRONMENT

FIELD

Embodiments of the invention relate to the field of security in computing systems. More particularly, embodiments of the invention relate to a secure virtual machine monitor to tear down a secure execution environment.

DESCRIPTION OF RELATED ART

Advances in processors and communication technologies have opened up many opportunities for applications that go beyond the traditional ways of doing business. Electronic Commerce (E-Commerce) and Business-to-Business (B2B) transactions are now becoming more popular and are conducted throughout global markets at continuously increasing rates. Unfortunately, while modem computers provide users convenient and efficient methods of doing business, communicating and transacting, they are also vulnerable for unscrupulous attacks.

Examples of these types of attacks include virus, intrusion, security breach, and tampering, to name a few. These attacks, which are often deliberate, may interfere with the normal operation of the system, may destroy files and other important data, and/or may be used to surreptitiously gain access to classified information. Computer security, therefore, is becoming more and more important to protect the integrity of the computer systems and increase the trust of users.

Because there are an ever-increasing number of financial and personal transactions that are being performed on both local and remote computers, there is a correspondingly increased need for the establishment of trustable or secure environments. For example, private data like credit card data, medical report data, bank account data, or the like, stored on a computer to facilitate transactions, or even manage personal finances, may be accessed, corrupted or abused by another user of the same computer or by another networked computer via a Local Area Network (LAN), a Wide Area Network (WAN), or by system interconnections established through access to the Internet. Obviously, users do not want their private data made public, altered, or used in inappropriate transactions, regardless of whether the private data resides only on their personal computer or on a remote computer as a result of a transaction involving private data across a network.

Various measures have been developed to reduce the threat of such harm, but most rely solely on security software in the form of detection software that searches for known viruses, validation software that validates the integrity of software modules before they are executed, and monitoring software that detects a limited number of abnormal events in the execution of software modules.

To provide uniformity across many platforms, most security software is relatively independent of the hardware on which it is running and therefore cannot use hardware features to increase the level of protections. Thus, the level of protection may be completely dependent on the security software. However the security software itself is subject to software attack, and thus provides only limited protection.

Further, various secure operating environment methodologies have also been developed to try to address privacy of information issues. For example, typical existing secure operating environments are often designed to prevent the loss of privacy by utilizing isolated systems that may operate using a closed set of only trusted software. These systems, however, are disadvantageous to the extent that they do not allow the simultaneous use of common, commercially available operating system and application software. Moreover, the establishment of large networks degrades the protections offered for these secure environments.

Other attempts have also been made to isolate a secure environment from an insecure environment within a system. Many of these implementations attempt to isolate non-trusted software from the secure environment while inherently trusting other software, such as the operating system. However, the operating system, may itself be untrustworthy due to corruption from updates or upgrades or from other untrustworthy or potentially hostile sources. Any piece of hardware and/or software that has access to the memory, such as a processor, bus master, input/output (I/O) device, etc., can potentially corrupt the operating system prior to and/or during execution, compromising the integrity of the secure environment.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Moreover, embodiments of the invention will be described in particular embodiments but may be implemented in hardware, software, firmware, middleware, or a combination thereof.

It should be noted that generally the terms computer system, processing system, computing system, computing device, computer, etc., refers to any sort of computing or networking device (e.g. computer, server, file server, application server, workstation, mainframe, network computer, laptop computer, mobile computing device, palm pilot, personal digital assistant, cell-phone, integrated circuit, fax machine, printer, copier, set-top box, etc.) that includes a processor, and/or a memory, and/or input/output devices, etc., or any sort of device, machine, or system capable of implementing instructions.

Figure 1:
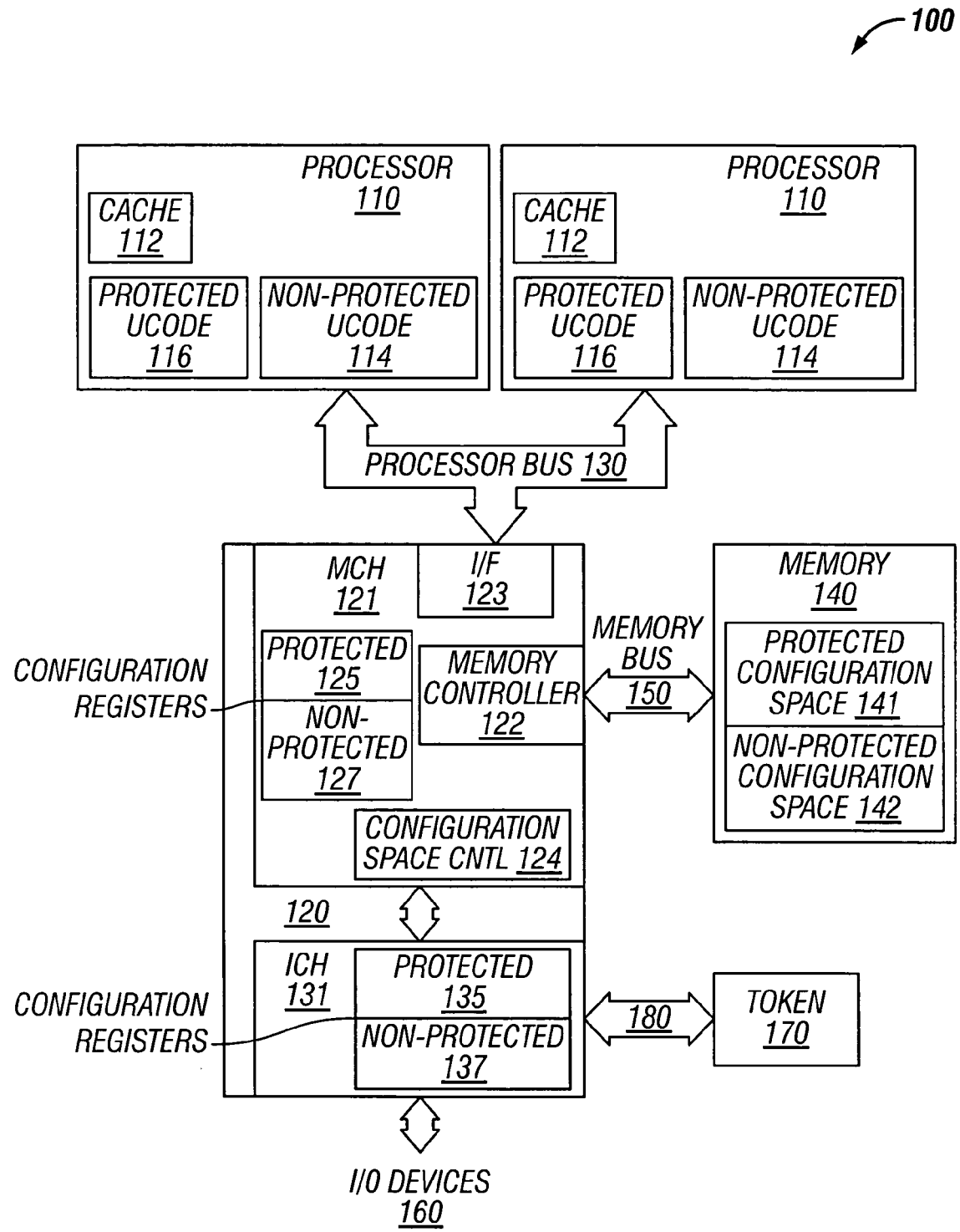
FIG. 1 shows a block diagram of a computing system, according to one embodiment of the invention.

FIG. 1 shows a block diagram of a computing system, according to one embodiment of the invention. Although FIG. 1 shows a particular configuration of system components, various embodiments of the invention may use other configurations. The illustrated system 100 includes one or more computing systems in the form of one or more processors 110 (two are shown in the illustrated embodiment, but one, three or more may be used), a memory 140, a logic circuit 120 coupled to the memory 140 through memory bus 150 and coupled to the processor(s) 110 through processor bus 130, and a token 170 coupled to the logic circuit 120 over bus 180.

Each processor 110 may include various elements, including any or all of: 1) cache memory 112, 2) non-protected microcode (uCode) 114, and 3) protected microcode 116. Microcode includes circuitry to generate operations and micro-operations in the execution of instructions, where instructions may include both program (software-implementable) operations and operations triggered by hardware events that may not be directly programmable. Protected microcode 116 includes microcode that may be executed only by protected instructions and/or as part of a protected operation. Non-protected microcode may be executed outside those restrictions. Microcode that initiates a command over processor bus 130 may identify the command as a protected command in various ways, including but not limited to: 1) asserting one or more particular control lines on the bus, 2) placing a predetermined identifier on the bus, 3) placing predetermined data on the data lines, 4) placing a predetermined address on the address lines, 5) asserting certain signals with timing that is unique to protected commands, etc. While in one embodiment the protected microcode 116 is co-resident with the non-protected microcode 114, in another embodiment the protected microcode 116 is physically and/or logically separate from the non-protected microcode 114.

Memory 140 may include all of main memory. However, some of the potential address space that would potentially be accessed in memory 140 may be reserved for other purposes, and accesses to those reserved addresses may be redirected to other parts of the system. Configuration space may be reserved in this manner. Configuration "space" is a conceptual term that refers to the range(s) of addresses that are reserved for implementation in logic circuit 120 for various activities, with accesses that are targeted to any address within the configuration space being redirected to various portions of logic circuit 120 rather than to memory 140 or to input-output devices.

FIG. 1 shows protected configurations space 141 and non-protected configuration space 142, which represent the ranges of addressable locations that are reserved for control and monitoring activities (protected and non-protected activities, respectively) that are implemented in logic circuit 120. Configuration space may be implemented with addresses that would otherwise be part of memory address space or input-output (I/O) address space. Read or write commands to at least a portion of the addresses in the configurations space are redirected to configurations registers in logic circuit 120. In some embodiments, other portions of the addresses in the configurations space are used for commands that trigger some type of action within the logic circuit 120 rather than being used to store data in, or read data from, a register. In still another embodiment, commands directed to specific addresses in the configuration space may be temporarily placed in registers before being passed on to circuits external to logic circuit 120 (e.g., to token 170 over bus 180).

While in one embodiment one or both of the protected configurations space 141 and non-protected configurations space 142 contain only contiguous addresses, in another embodiment the addresses are not all contiguous. As used herein, the term "contiguous" may refer to contiguous in physical memory space or contiguous virtual memory space.

Logic circuit 120 may include various components, such as but not limited to: interface (I/F) 123 to decode the destination address of any command received over processor bus 130, memory controller 122 to control operations over memory bus 150, configuration registers 125, 127, 135 and 137, and configuration space control logic 124 to control operations within logic circuit 120. In one embodiment logic circuit 120 includes memory control hub (MCH) 121 and I/O control hub (ICH) 131, which may be implemented as separate integrated circuits. In an alternate embodiment, logic circuit 120 may be organized differently than shown in FIG. 1, and may be implemented within one or more integrated circuits in any suitable manner.

In one embodiment, I/F 123 may received the commands seen on processor bus 130 and decode the destination addresses to determine how to respond. Configuration space control logic 124 may be used to convert some decoded addresses into the appropriate response. Such response may include, but is not limited to:

1) in response to the address being directed to another device on the processor bus 130, ignore the command,
2) in response to the address being directed to a viable location in memory 140, initiate the indicated read or write operation to memory 140 over memory bus 150,
3) in response to the address being directed to one of I/O devices 160, pass the command along to the I/O device over the appropriate bus,
4) in response to the address being directed to configuration space, determine which of the following actions is associated with that particular address and perform that action: a) perform the indicated read or write operation on the configuration register specified by the address, b) initiate a non-read/write action within logic circuit 120, c) send a read, write or other command to token 170 over bus 180 (in one embodiment, token 170 contains protected information associated with various cryptographic and/or validations processes), d) abort the command if the command indicates an operation that is not permitted.

Such impermissible operations may include but are not limited to: performing a non-protected operation in protected configuration space, performing a protected operation that is currently restricted, and performing a protected operation in an impermissible format. Aborting a command may take various forms, including but not limited to: timing out without responding, responding with an error code, responding with meaningless data (e.g., all 0's or all 1's), exiting the protected operational environment, and performing a system reset.

In one embodiment, the configuration registers include protected configuration registers 125, 135, and non-protected configuration registers 127, 137. Protected configurations registers may be used to control and monitor protected operations, and may be inaccessible to non-protected software and/or hardware, while non-protected configurations registers may be used for non-protected operations and may be accessible to non-protected hardware and/or software. In one embodiment, protected configuration registers may be implemented in physical registers that are physically and permanently distinct from non-protected registers. In another embodiment, one or more physical registers may be programmably designated as protected or non-protected at different times. In still another embodiment, one or more physical registers may be designated as both protected and non-protected, and be accessible by both protected and non-protected operations through different addresses.

In a particular embodiment, some configurations registers may be physically implemented in MCH 121 (e.g., configuration registers 125, 127, in FIG. 1), while other configuration registers may be physically implemented in ICH 131 (e.g., configuration registers 135, 137 in FIG. 1). Each group may include both protected (e.g., 125, 135) and non-protected (e.g., 127, 137) configuration registers. In such an embodiment, MCH 121 may pass on to ICH 131 and any command directed to an address in configuration registers 135, 137 or that is otherwise implementable through ICH 131.

In one embodiment, logic circuit 120 may have a fuse, or its circuit equivalent, that may be blown at manufacturing time and is inaccessible after manufacturing, to disable (or alternately to enable) the operation of some or all of the protected configuration space, so that a single integrated circuit may be manufactured for both protected and non-protected applications, with the choice being a simple manufacturing operation rather than a circuit change.

In one embodiment, the configuration space is accessible only by processors 110, so that no other bus masters, I/O devices, or other internal devices are permitted to access the configuration space. Attempted commands to the configuration space by non-permitted devices may be handled in various ways, including but not limited to: 1) ignore the command, 2) return a default value such as all 0's or all 1's in response to a read command, 3) return an error code, 4) generate a system interrupt, and 5) generate a system reset.

Non-protected configuration space may be accessed by commands initiated from non-protected microcode 114.

In one embodiment, protected configuration space may be accessed in either of two ways: 1) By issuing certain designated commands implemented through protected microcode 116. Commands issued to protected configuration space from non-protected microcode 114 will not succeed. 2) By issuing a command from protected microcode 116 that opens the protected configuration space to access by commands from non-protected microcode 114 and then executing the commands from non-protected microcode 114. A separate command from protected microcode 116 may close the protected configuration space to further access by commands from non-protected microcode 114.

In some embodiments, the specific ones of protected configuration registers 125, 127 may be further restricted from access. Such restrictions may include, but are not limited to: 1) permitting read access but not write access by one or more particular processors 110, 2) restricting both read and write access by one or more particular processors 110, and 3) restricting modification of certain bits of the register.

In one embodiment, processors 110 may be prevented from caching any addresses within the protected configuration space 141. In another embodiment, processors 110 may be prevented from caching any addresses within both the protected configuration space 141 and the non-protected configuration space 142.

Each valid address within the configuration space 141, 142 may be mapped to various circuits, including but not limited to one or more of 1) a particular configuration register, 2) the logic to perform the associated internal action, and 3) another bus for passing the command on to a device external to logic circuit 120. In one embodiment, multiple addresses may be mapped to the same configuration register, internal action, or external bus. In one embodiment, an address in protected configuration space and an address in non-protected configuration space may be mapped to the same configuration register, internal action, or external bus. In a particular embodiment, one of two addresses that are mapped to the same configuration may be limited to a read operation, while the other address may not be so restricted.

In some embodiments, the mapping logic is included in configuration space control logic 124. In one embodiment, the mapping used may be hard-wired at the time of manufacture. In another embodiment, the mapping may be programmed into non-volatile memory. In still another embodiment, the mapping may be programmed into volatile memory when the system is initialized and/or when the protected operating environment is initialized.

Figure 2:
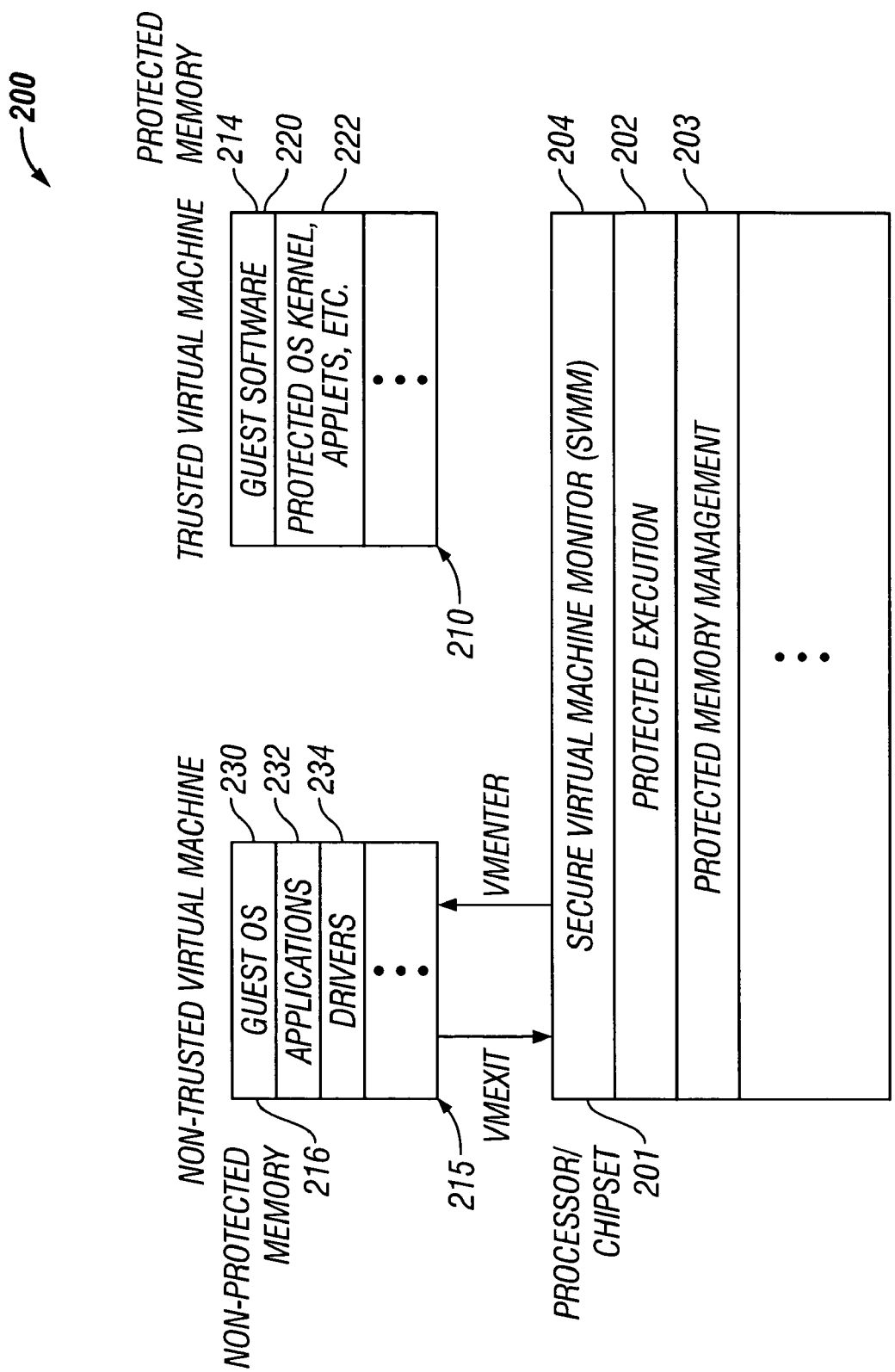
FIG. 2 shows a block diagram of a system having a secure virtual machine monitor (SVMM) to tear down a secure execution environment, according to one embodiment on the invention.

With reference to FIG. 2, FIG. 2 shows a block diagram of a system 200 having a secure virtual machine monitor (SVMM) to tear down a secure execution environment, according to one embodiment of the invention. Particularly, FIG. 2 illustrates a processor and/or chipset 201 that operates in a normal execution mode and a secure execution mode.

The secure execution mode creates a secure execution environment and operates utilizing protected microcode and protected memory, alone, or in conjunction with non-protected microcode instructions and non-protected memory, as previously discussed. On the other hand, in the normal execution mode generally only non-protected microcode instructions and non-protected configuration memory spaces are utilized.

Further, as particularly shown in FIG. 2, the processor and/or chipset 201 implements protected or secure execution functionality 201 and protected or secure memory management functionality 203 by utilizing protected microcode instructions and protected configuration memory space, as previously described in detail.

The processor and/or chipset 201 further implements a secure virtual machine monitor (SVMM) 204 to aid in implementing the secure execution mode. In one embodiment, the secure execution mode enables a plurality of separate virtual machines to be created that operate simultaneously and separately from one another. These separate virtual machines may simultaneously run trusted software utilizing protected instructions and protected memory and/or non-trusted software utilizing non-protected instructions and non-protected memory.

For example, as shown in FIG. 2, a first virtual machine 210 may be created by the secure virtual machine monitor 204 to implement trusted guest software 220 in association with a protected memory area 214. Also, other trusted software may also be implemented within trusted virtual machine 210 or other separate virtual machines including such trusted software as a protected operating system (OS) kernels, applets, etc. 222. A second non-trusted virtual machine 215 may also be created by the secure virtual machine monitor 204 to implement a non-trusted guest OS 230 simultaneously in association with non-protected memory area 216. Additionally, applications 232, drivers 234, other software, etc., may also be implemented in non-trusted virtual machine 215 or other non-trusted virtual machines and associated non-protected memory. It should be appreciated that, in the secure execution mode, that any number of virtual machines each implementing trusted or non-trusted software respectively, utilizing protected instructions and protected memory or non-protected memory instructions and non-protected, respectively, may be created and utilized.

As will be described in more detail below, in one embodiment, responsive to a command to tear down the secure execution environment, the secure virtual machine monitor 204 will scrub the protected memory area 214 associated with the trusted guest software and then causes the processor 201 to exit out of the secure execution mode. After this, along with other functionality, the secure virtual machine monitor 204 instructs the guest OS 230 to resume control in the normal execution mode. More generally, a tear down of the secure execution environment causes all of the trusted virtual machines to be closed and associated protected memory areas to be scrubbed.

In one embodiment, the secure virtual machine monitor 204 utilizes virtual machine extensions (VMX) in order to create the one or more virtual machines 210, 215, etc. For example, virtual machine extension instruction support is presently available in such processors as INTEL ARCHITECTURE (IA) 32 bit processors, as well as other commercially available processors.

In this configuration, non-trusted guest software, such as guest OS 230, applications 232, drivers 234, may be run unmodified by the processor 201 in the virtual machine 215 or additional virtual machines, while simultaneously operating trusted software (e.g. guest software 220) in a trusted virtual machine 210 or other trusted virtual machines. However, certain guest events, instructions, and situations occurring in the operation of the non-trusted virtual machine 215 may cause a trap to the secure virtual machine monitor 204.

In one embodiment, an instruction or command (e.g. a virtual monitor call (e.g. VMCALL)) allows the non-trusted guest OS 230 to force a virtual machine exit (e.g. VMEXIT) command to the secure virtual machine monitor 204. As will be discussed, after certain operations such as scrubbing the protected memory area associated with the non-trusted guest OS and exiting out of the secure execution mode, the secure virtual machine monitor 204 may initiate a command or instruction (e.g. a virtual machine resume (e.g. VMRESUME) or a virtual machine launch (e.g. VMLAUNCH)) to cause a virtual machine entry (e.g. VMENTER) back to the non-trusted guest OS 230 such that the non-trusted guest OS resumes control in the normal execution mode without the virtual machine container.

Figure 3:
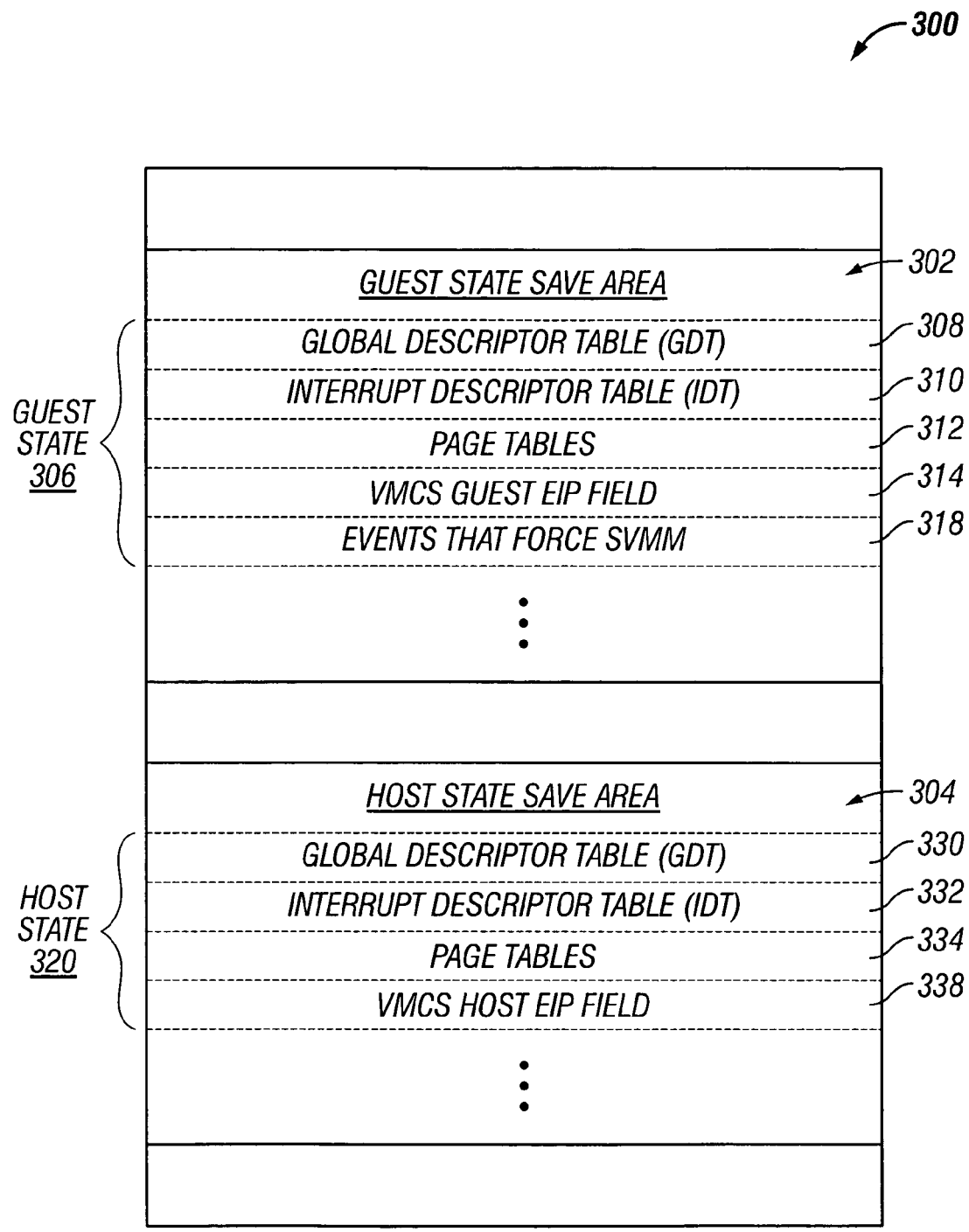
FIG. 3 shows a block diagram of an example of a virtual machine control structure, according to one embodiment of the invention.

The transitions between the secure virtual machine monitor 204 and the non-trusted guest software, such as guest OS 230, in one embodiment, may be facilitated by the use of a virtual machine control structure (VMCS). With reference also to FIG. 3, FIG. 3 shows a block diagram of an example of a virtual machine control structure 300, according to one embodiment of the invention. As shown in FIG. 3, the virtual machine control structure 300 includes a guest state save area 302 and a host state save area 304.

Generally, the virtual machine control structure 300 stores the guest state in the guest state save area 302, the monitor state in the host state save area 304, and includes various control registers that determine what guest events cause a trap to the secure virtual machine monitor 204. The virtual machine control structure 300 is used to determine what state is loaded and stored upon virtual machine exit (e.g. VMEXIT) and virtual machine enter (e.g. VMENTER), respectively. Particularly, the virtual machine control structure stores guest state information related to the non-trusted guest OS for use in restoring the non-trusted guest OS in the normal execution mode.

For example, in one embodiment, during a trap from the non-trusted guest OS 230 to the secure virtual machine monitor 204 (e.g. a virtual machine exit (e.g. VMEXIT)), the guest state of the non-trusted guest of 230 is stored to the guest state save area 302 of the virtual machine control structure 300. In one embodiment, the guest state 306 may include a global descriptor table (GDT) 308, an interrupt descriptor table (IDT) 310, page tables 312, and a VMCS guest entry point field 314. Additionally, the guest state save area 302 may include control registers 318 that define guest events that force a trap to the secure virtual machine monitor 204.

The guest OS entry point field 314 points to a command used for instructing the non-trusted guest OS to resume control at a virtual address.

Also, in one embodiment, the host state save area 304 includes a global descriptor table (GDT) 330, an interrupt descriptor table (IDT) 332, page tables 334, and a VMCS host entry point field 338, as will be discussed.

Upon transition back to the non-trusted guest OS 230 state, denoted as virtual machine enter (e.g. VMENTER), the guest OS state is restored from the guest state save area 302 of the virtual machine control structure 300. It should be noted that the secure virtual machine monitor 204 may read and write fields into the virtual machine control structure 300 using virtual machine read and write instructions.

As previously discussed, the secure virtual machine monitor 204 allows for the creation of a secure execution environment, which allows for the creation of separate and simultaneously operable virtual machines to run trusted guest software (e.g. 220, 222) free from observation or interference from non-trusted guest software (e.g. 230, 232, 234).

The secure virtual machine monitor 204, and the secure environment it is providing, may be torn down for a variety of reasons. For example, the secure execution environment may be torn down before powering down the computing system, before entering a system sleep state, in response to various security breach events that may be detected by the secure virtual machine monitor, or when the user no longer wishes to run trusted software. These triggering events may be stored in configuration registers 318 of the virtual machine control structure 300 for automatically trapping to the secure virtual machine monitor 204.

At the end of the secure execution environment tear down process, the secure virtual machine monitor 204 transitions back to the originating non-trusted guest operating system 230. After this transition, the non-trusted guest operating system 230 runs without the secure virtual machine monitor 204 and without a virtual machine container. This transition typically involves a protected or secure execution mode to a non-protected or non-secure mode transition. Further, the entire state of the computing system is transitioned from the secure virtual machine monitor state back to the non-trusted guest OS state, as will be discussed.

Figure 4:
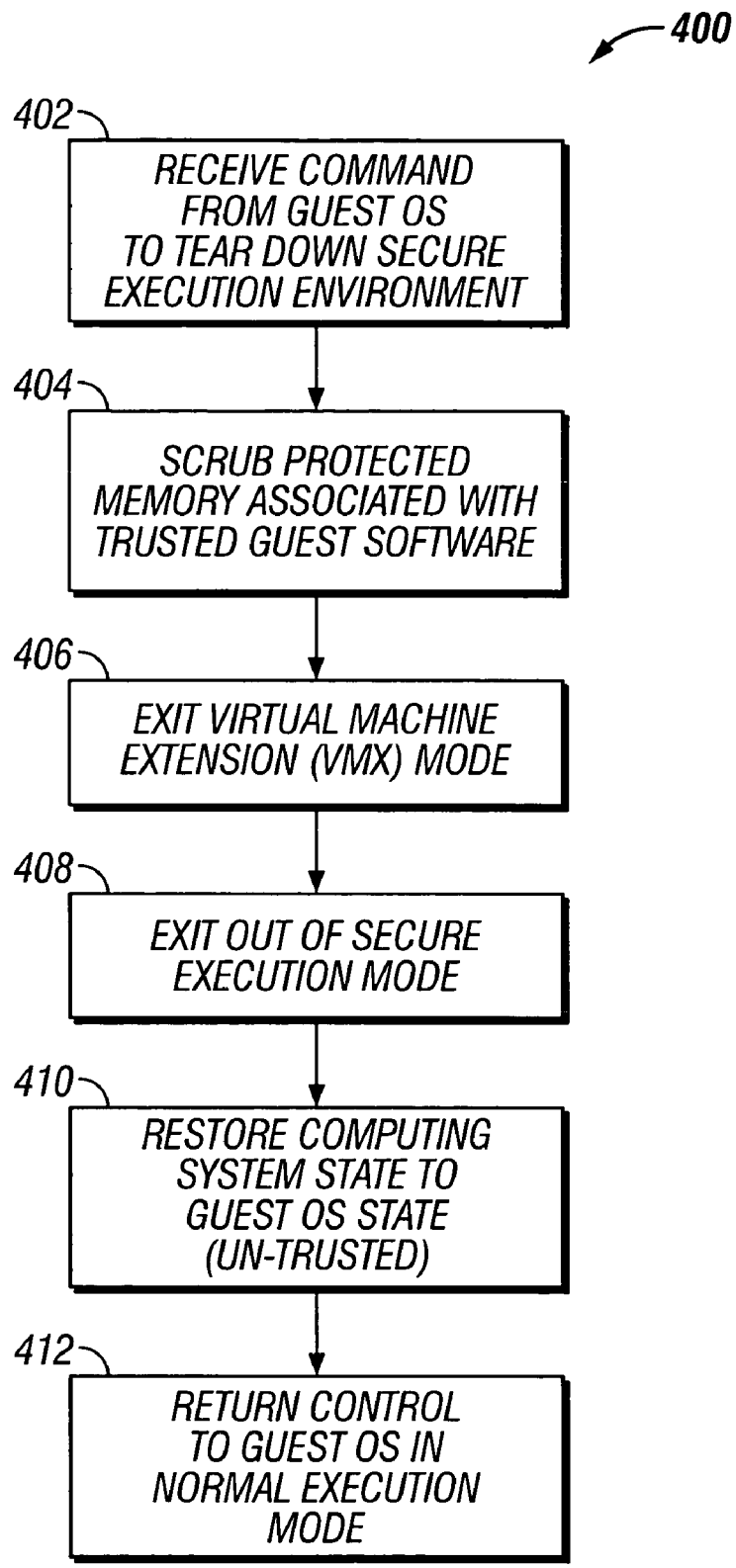
FIG. 4 shows a flow diagram illustrating a process to tear down a secure execution environment and return control to a non-trusted guest operating system (OS), according to one embodiment of the invention.

Turning now to FIG. 4, FIG. 4 shows a flow diagram illustrating a process 400 to tear down a secure execution environment and return control to a non-trusted guest operating system (OS), according to one embodiment of the invention. As shown in FIG. 4, at block 402 a command is received from the non-trusted guest operating system 230 to tear down the secure execution environment. Particularly, the non-trusted guest operating system 230 may communicate a command to the secure virtual machine monitor 204 (e.g. a VMEXIT) to tear down the secure execution environment. For example, this may be due to a user exiting out of other trusted guest software or shutting the computing system down. Alternatively, the secure virtual machine monitor 204 may itself decide to tear down the secure execution environment due to such events as a security breach.

In order to exit out of the secure execution environment, the secure virtual machine monitor 204 typically performs the following operations.

At block 404, the protected memory associated with the trusted guest software is scrubbed under the control of the secure virtual machine monitor. In this way, private or secret information that may be sensitive and that is not for sharing may be scrubbed such that is not accessible from other programs or other computing systems.

Next, the process 400 under the control of the secure virtual machine monitor 204 exits the virtual machine extension (VMX) mode (block 406). Then, at block 408 the process 400 exits out of secure execution mode. For example, the secure virtual machine monitor 204 may execute a secure execution mode exit instruction such that the computing system exits out of the secure execution mode. In this way, the secure execution environment is torn down and the secure execution mode is exited.

Next, the computing system state is returned to the non-trusted guest operating system state (block 410). Control is then returned to the non-trusted guest operating system 230 (block 412) in the normal execution mode.

The previously described process 400 can be used in cases where the tear down of the secure execution mode is instituted by the secure virtual machine monitor itself, such as in the case where the secure virtual machine monitor decides to tear down the secure execution mode due to a security breach, or the secure execution environment teardown may be instituted by the non-trusted guest operating system.

By performing these operations in the secure virtual monitor context, in which the secure execution mode is exited after first exiting the virtual machine extension mode, potential denial of service attacks may be avoided. Particularly, virtual machine extension mode features are used to facilitate the efficient execution of a secure execution mode teardown.

Figure 5A:
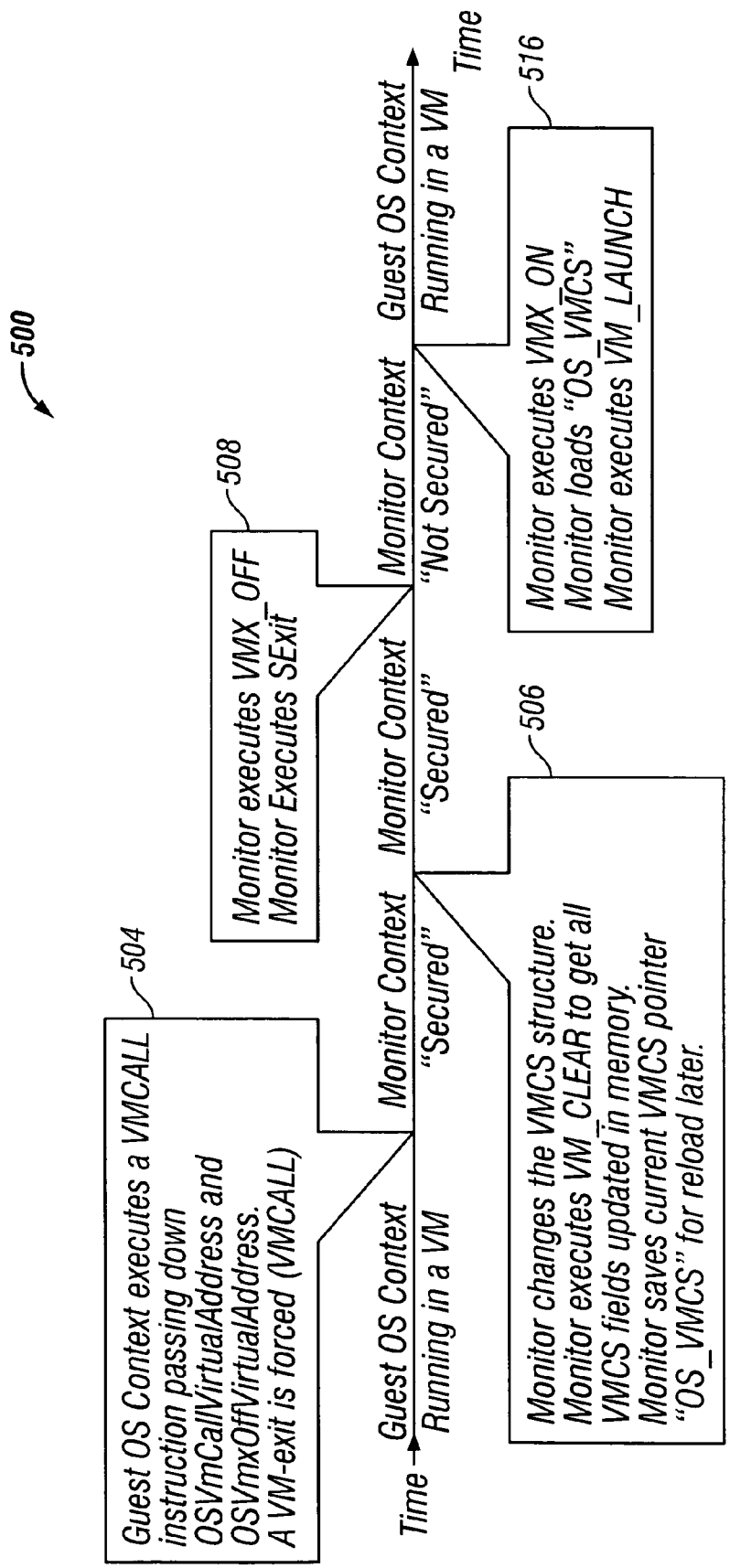
FIG. 5 shows a time-line flow diagram of pseudo-code that further illustrates a process to tear down the secure execution environment and returns control to a non-trusted guest operating system (OS), according to one embodiment of the invention.
Figure 5B:
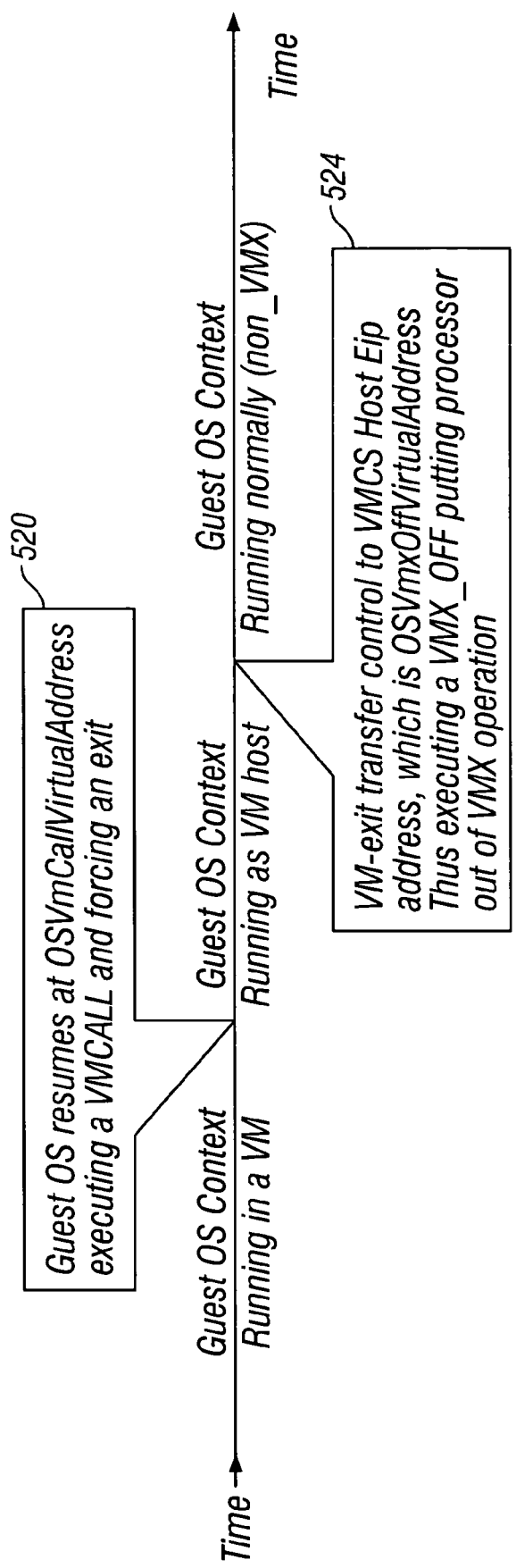

Turning now to FIG. 5, FIG. 5 shows a time-line flow diagram of pseudo-code that further illustrates a process 500 to tear down the secure execution environment and returns control to a non-trusted guest operating system (OS), according to one embodiment of the invention. It should be noted that it is assumed that the computing system is presently operating in the secure execution mode and that the secure virtual machine monitor has previously scrubbed the protected memory associated with the trusted guest software in preparation for the secure execution environment teardown.

The process 500 can be broken down into two phases. In phase 1, illustrated by blocks 504, 506, and 508 the secure execution environment is torn down. This allows for the execution of a secure environment exit instruction by the secure virtual machine monitor. In the second phase, illustrated in blocks 516, 520, and 524, virtual machine extensions (VMXs) are used to switch from the secure virtual machine monitor back to the non-trusted guest operating system.

At block 504, the non-trusted guest operating system executes a virtual machine call (e.g. VMCALL) instruction passing down two parameters to the secure virtual machine monitor (VMCS). The first parameter is the virtual address of the operating system's virtual machine call function (e.g. OSVmCallVirtualAddress) within the operating system. The second parameter is the virtual address of the operating system's virtual machine extension off function (e.g. OSVmxOffVirtualAddress) within the operating system. This function is utilized to exit out of virtual machine extension mode. Both addresses are virtual addresses within the guest operating system's virtual address space. Thus, a virtual machine exit (e.g. a VMEXIT) has been forced.

Next, at block 506 the secure virtual machine monitor obtains control and performs the following operations. The secure virtual machine monitor first clears the VMCS control structure (e.g. VM_CLEAR) and updates the VMCS guest state of the guest state save area. Further, the secure virtual machine monitor updates the guest state fields of the virtual machine control structure and copies them to the host state fields within the same virtual machine control structure.

For example, referring briefly to FIGS. 2 and 3, the secure virtual machine monitor 204 updates the guest state fields 306 of the guest state save area 302 and copies them to the host state fields 320 of the virtual machine control structure 300.

Particularly, the secure virtual machine monitor 204 programs the VMCS guest entry point (EIP) field 314 to contain the virtual address of the operating system's virtual machine call function (e.g. OSVmCallVirtualAddress). Further, the secure virtual machine monitor 204 programs the VMCS host entry point (EIP) field 338 to be the pointer to the operating system's virtual machine extension off function (e.g. OSVmxOffVirtualAddress).

Further, the current virtual machine control structure is saved by the secure virtual machine monitor 204 to be reloaded later (e.g. saved as "OS_VMCS"). These operations prepare the virtual machine control structure 300 for a context switch between the secure virtual machine monitor environment and the non-trusted guest operating system environment.

Next, as shown in block 508, the secure virtual machine monitor executes an instruction to turn virtual machine extension functionality off (e.g. VMX_OFF). The secure virtual machine monitor then executes an instruction to exit out of the secure execution mode (e.g. SExit). This causes the end of the secure execution mode. The secure execution environment has now been torn down and the secure virtual machine monitor needs to perform a context switch from the secure virtual machine monitor context back to the non-trusted guest operating system context.

At block 516, the secure virtual machine monitor then executes a virtual machine extension on (e.g. VMX_ON) instruction putting the computing system back into the virtual machine extension mode. Virtual machine extension transition functionality will be used to accomplish the context switch between the secure virtual machine monitor back to the non-trusted guest operating system context. The secure virtual machine monitor then reloads the virtual machine control structure (e.g. OS_VMCS). The secure virtual machine monitor then executes a virtual machine launch instruction (e.g. VM_LAUNCH) to resume the non-trusted guest operating system. Particularly, the processor loads the guest state from the virtual machine control structure and starts execution at the virtual address of the operating system's virtual machine call function (e.g. OSVmCallVirtualAddress). Thus, at block 520, the non-trusted guest operating system 105 resumes operation at the virtual address of the operating system's virtual machine call function and executes a instruction (e.g. VMCALL) to trap immediately back into the secure virtual machine monitor.

Then, at block 524, the processor loads the host state from the virtual machine control structure. Particularly, the host state save area (FIG. 3), contains the operating system state, as previously discussed. The processor starts execution of the virtual machine extension off function at the operating system's virtual address (which was saved as the VMCS Host EIP field). This causes the execution of a virtual machine extension off instruction (VMX_OFF), which returns the computing system to a normal non-virtual machine extension mode. The computing system can then continue with non-trusted guest operating system execution outside of both the virtual machine extension mode and the secure execution mode. Therefore the computing system is running in a normal execution mode.

The previously described process 500 provides a reliable way of tearing down a secure execution environment. The process 500 minimizes the passing of guest operating system state information back and forth to the secure virtual machine monitor by the use of the virtual machine control structure. Also, by exiting out of the secure execution mode utilizing the secure virtual machine monitor, denial of service attacks in which rogue software can assume control after the virtual machine extension architecture is torn down are minimized.

Accordingly, the process 500 enhances the reliability of the secure execution environment by minimizing denial of service attacks that can happen during the tear down of the secure execution environment. The process 500 also avoids the inconsistency of processor states by using the virtual machine control structure and virtual machine extension features to switch the context back to the non-trusted guest operating context. Particularly, the process 500 turns off secured operations utilizing the secure virtual machine monitor and uses virtual machine extension features to switch back to the non-trusted guest operating system that thereafter operates in a normal execution mode.

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof. When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. An apparatus comprising:
    a processor having a normal execution mode and a secure execution mode to create a secure execution environment
    in which a plurality of separate virtual machines are created that operate simultaneously and separately from one another including at least a first virtual machine to implement trusted guest software in a protected memory area and a second virtual machine to implement a non-trusted guest operating system (OS) in a non-protected memory area; and
    a secure virtual machine monitor (SVMM) that responsive to a command to tear down the secure execution environment from the non-trusted guest OS causes the processor to exit out of the secure execution mode, scrubs the protected memory area associated with the trusted guest software, tears down the secure execution environment, and instructs the non-trusted guest OS to resume control in the normal execution mode.

2. The apparatus of claim 1, further comprising a virtual machine control structure (VCMS) to store guest state information related to the non-trusted guest operating system (OS) for use in restoring the non-trusted guest OS in the normal execution mode.

3. The apparatus of claim 2, wherein the virtual machine control structure (VCMS) stores a guest OS entry point field to point to a command used for instructing the non-trusted guest OS to resume control at a virtual address and a host entry point field to point to a command to instruct the processor to exit out of a virtual machine execution mode.

4. The apparatus of claim 1, further comprising, the SVMM causing the processor to exit out of a virtual machine extension mode before exiting out of the secure execution mode when the secure execution environment is torn down.

5. The apparatus of claim 1, wherein the secure virtual machine monitor (SVMM) issues the command to tear down the secure execution environment.

6. The apparatus of claim 5, wherein the secure virtual machine monitor (SVMM) issues the command to tear down the secure execution environment due to a detected security breach.

7. A method comprising:
    providing a normal execution mode in a processor and a secure execution mode in a processor; and
    creating a secure execution environment in which a plurality of separate virtual machines operate simultaneously and separately from one another including at least a first virtual machine to implement trusted guest software in a protected memory area and a second virtual machine to implement a non-trusted guest operating system (OS) in a non-protected memory area;
    wherein responsive to a command to tear down the secure execution environment from the non-trusted guest OS exiting out of the secure execution mode, scrubbing the protected memory area associated with the trusted guest software, tearing down the secure execution environment, and instructing the non-trusted guest OS to resume control in the normal execution mode.

8. The method of claim 7, further comprising storing guest state information related to the non-trusted guest operating system (OS) for use in restoring the non-trusted guest OS in the normal execution mode.

9. The method of claim 8, further comprising:
    storing a guest OS entry point field to point to a command used for instructing the guest OS to resume control at a virtual address; and
    storing a host entry point field to point to a command to instruct the processor to exit out of a virtual machine execution mode.

10. The method of claim 7, further comprising causing the processor to exit out of a virtual machine extension mode before exiting out of the secure execution mode when the secure execution environment is torn down.

11. The method of claim 7, further comprising issuing the command to tear down the secure execution environment due to a detected security breach.

12. A machine-readable medium having stored thereon instructions, which when executed by a machine, cause the machine to perform the following operations comprising:
   providing a normal execution mode in a processor and a secure execution mode in a processor; and
   creating a secure execution environment in which a plurality of separate virtual machines that operate simultaneously and separately from one another including at least a first virtual machine to implement trusted guest software in a protected memory area and a second virtual machine to implement a non-trusted guest operating system (OS) in a non-protected memory area;
   wherein responsive to a command to tear down the secure execution environment from the non-trusted guest OS exiting out of the secure execution mode, scrubbing the protected memory area associated with the trusted guest software, tearing down the secure execution environment, and instructing the non-trusted guest OS to resume control in the normal execution mode.

13. The machine-readable medium of claim 12, wherein the instructions cause the machine to perform further operations comprising storing guest state information related to the non-trusted guest operating system (OS) for use in restoring the non-trusted guest OS in the normal execution mode.

14. The machine-readable medium of claim 13, wherein the instructions cause the machine to perform further operations comprising:
   storing a guest OS entry point field to point to a command used for instructing the guest OS to resume control at a virtual address; and
   storing a host entry point field to point to a command to instruct the processor to exit out of a virtual machine execution mode.

15. The machine-readable medium of claim 12, wherein the instructions cause the machine to perform further operations comprising causing the processor to exit out of a virtual machine extension mode before exiting out of the secure execution mode when the secure execution environment is torn down.

16. The machine-readable medium of claim 12, wherein the instructions cause the machine to perform further operations comprising issuing the command to tear down the secure execution environment due to a detected security breach.

17. A system comprising:
   a processor including virtual machine extension (VMX) instruction support, the processor further having a normal execution mode and a secure execution mode to create a secure execution environment created that operate simultaneously and separately from one another including at least a first virtual machine to implement trusted guest software in the protected memory area and a second virtual machine to implement a non-trusted guest operating system (OS) in the non-protected memory area;
   a memory including a protected memory area and a non-protected memory area; and
   a secure virtual machine monitor (SVMM) that responsive to a command to tear down the secure execution environment from the non-trusted guest OS causes the processor to exit out of the secure execution mode, scrubs the protected memory area associated with the trusted guest software, tears down the secure execution environment, and instructs the non-trusted guest OS to resume control in the normal execution mode.

18. The system of claim 17, further comprising a virtual machine control structure (VCMS) to store guest state information related to the non-trusted guest operating system (OS) for use in restoring the non-trusted guest OS in the normal execution mode.

19. The system of claim 18, wherein the virtual machine control structure (VCMS) stores a guest OS entry point field to point to a command used for instructing the non-trusted guest OS to resume control at a virtual address and a host entry point field to point to a command to instruct the processor to exit out of a virtual machine execution mode.

20. The system of claim 17, further comprising, the SVMM causing the processor to exit out of a virtual machine extension mode before exiting out of secure execution mode when the secure execution environment is torn down.

21. The system of claim 17, wherein the secure virtual machine monitor (SVMM) issues the command to tear down the secure execution environment.

22. The system of claim 21, wherein the secure virtual machine monitor (SVMM) issues the command to tear down the secure execution environment due to a detected security breach.

* * * * *